(12) United States Patent
Johnston et al.

(10) Patent No.: US 6,270,602 B1
(45) Date of Patent: Aug. 7, 2001

(54) AIR REMOVAL AND FASTENER EXTRACTION SYSTEM

(75) Inventors: Eugene A. Johnston; William H. Brugman; Johnathon L. Logsden, all of Muscatine, IA (US)

(73) Assignee: Bandag Incorporated, Muscatine, IA (US)

( * ) Notice: Subject to any disclaimer, the term of this patent is extended or adjusted under 35 U.S.C. 154(b) by 0 days.

(21) Appl. No.: 09/246,819

(22) Filed: Feb. 8, 1999

(51) Int. Cl.[7] .................................................. B29D 30/56
(52) U.S. Cl. ............................ 156/92; 156/96; 156/323; 156/394.1; 156/989
(58) Field of Search ............................. 156/96, 91, 92, 156/323, 394.1, 909

(56) References Cited

U.S. PATENT DOCUMENTS 3,325,326 * 6/1967 Schelkmann ........................ 156/96
4,105,482 * 8/1978 Wapelhorst et al. ................ 156/96
4,328,053   5/1982 Medlin, Jr. .......................... 156/96
4,909,873 * 3/1990 Detwiler .............................. 156/96
5,173,353 * 12/1992 Yamamoto .......................... 156/96

OTHER PUBLICATIONS

"Product Alert", by Bandag, Incorporated, bearing a designation of "Feb., 1998" (1 color Sheet).

* cited by examiner

Primary Examiner—Geoffrey L. Knable
(74) Attorney, Agent, or Firm—Leydig, Voit & Mayer, Ltd.

(57) ABSTRACT

An air removal and fastener extraction system for use in retreading tires is disclosed. The system includes a strap that is disposed over a splice region of the tread during precure retreading. A plurality of fasteners are inserted through the strap and across the splice. This securely holds the splice region intact, allows air to be vented during curing, and permits removal of all fasteners in a single pulling motion exerted on the strap after the curing process is completed.

18 Claims, 7 Drawing Sheets

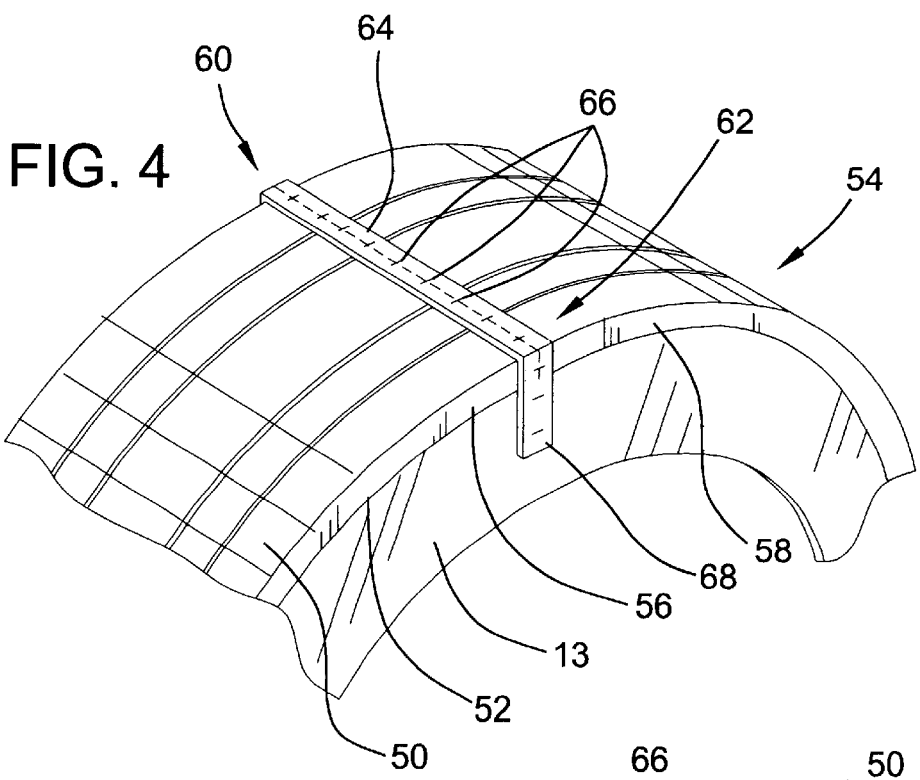
FIG. 4
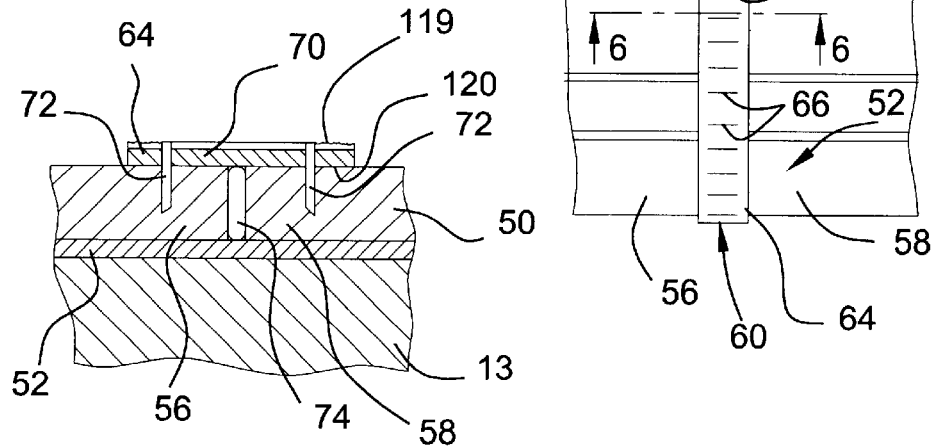
FIG. 5
FIG. 6

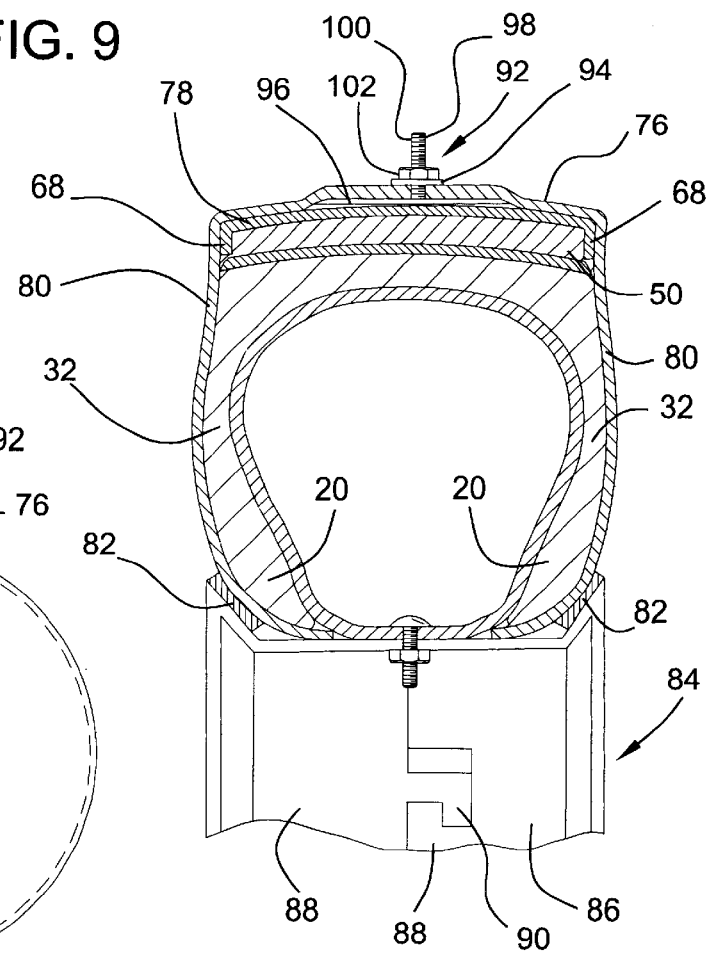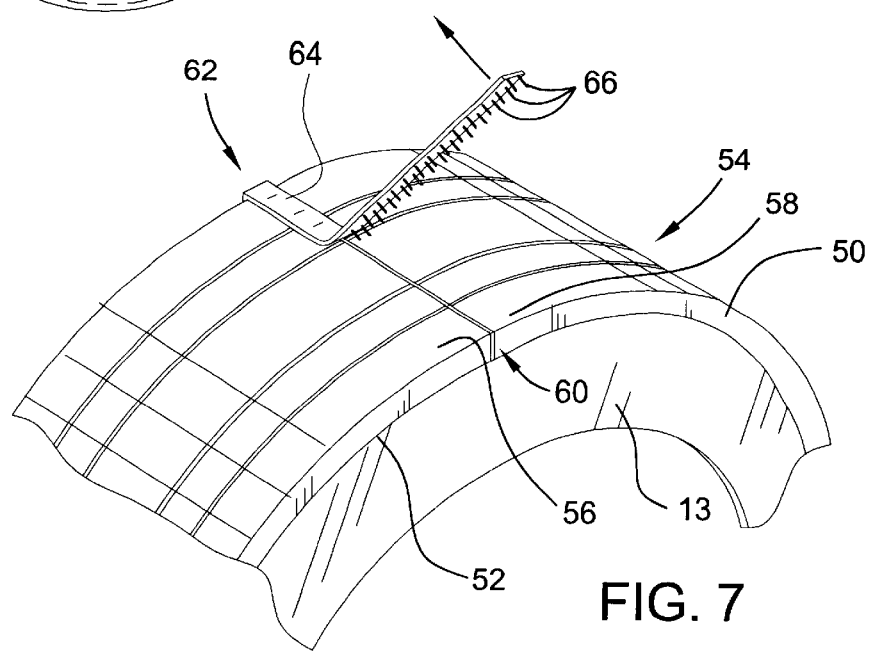

AIR REMOVAL AND FASTENER EXTRACTION SYSTEM

TECHNICAL FIELD

This invention relates generally to retreaded tires. More specifically, this invention relates to an air removal and fastener extraction system. More specifically, this invention relates to a method and system to assist in the removal of air from an assembled tire during retread curing and to extract and retain temporary fasteners used during the curing of retreaded tires.

BACKGROUND OF THE INVENTION

Tires have been retreaded for several decades according to a variety of methods. Retreading tires provides an economical way to gain additional use of a tire casing after wearing of the original tread and. According to one conventional method of retreading, sometimes referred to as precure retreading, a used casing is inspected for defects. The casing is then buffed to remove the tread and to produce a surface suitable for bonding a new tread layer. In addition to buffing, the shoulders of the casing may be trimmed to provide the proper crown width for the new tread. The buffed surface is again inspected for casing injuries. Next, skiving and filling of the casing are performed, as necessary, to restore the shape of the casing. Skiving includes the removal of damaged material from the casing before making a repair. Filling includes disposing repair gum into the skived out injured areas. Repair units are installed as necessary to restore integrity to the casing.

A bonding layer and a new tread layer are built about the circumference of the buffed surface. The bonding layer (e.g., layer of cushion gum) and tread layer are prepared. The ends of the bonding layer are cut at an appropriate length so that the bonding layer generally extends about the circumference of the casing. The bonding layer is disposed about the circumference of the buffed surface of the tire casing. The tread ends are prepared for building a tread splice. Preparation of the tread ends includes cutting the tread at an appropriate length to generally extend about the entire circumference of the casing, brushing a thin layer of tire cement on each tread end, drying the cement, disposing the ends of the tread in close proximity to one another, and mating the tread ends together to form a tread splice. A portion of bonding material is sometimes disposed between the leading edge and the trailing edge of the tread ends as an adhesive. The new tread layer is wrapped about the circumference of the tire casing over the bonding layer.

During the process of building, temporary fasteners (e.g., staples) hold the tread splice together. Each staple generally has a pair of prongs, where one prong is inserted into the trailing edge of the tread layer and the other prong is inserted into the leading edge of the tread layer to retain the tread ends in position until curing is complete.

A fabric wick material is then placed on the tread layer at a location remote from the tread splice. The wick is temporarily affixed with fasteners (e.g., staples) to the tread surface of the assembled tire. The wick permits the passage of air from the assembled tire to an exhaust fitting of an envelope. The wick is positioned between the tread and the envelope. Placement of the wick anywhere about the circumference of the tread layer, except directly over the tread splice, prevents the uncured bonding layer from plugging the wick. Plugging of the wick causes improper venting, which in turn results in a poorly bonded retreaded tire. A disadvantage of such conventional wicks is that it is difficult to determine when to replace the wick, which results in decreased wick effectiveness over time.

A wick liner (e.g., plastic film, rubber sheet) is used in conjunction with the wick to prevent the bonding layer from penetrating the wick during curing, which destroys the effectiveness of the wick. Plastic wick liners are disadvantageous because they permit the transfer of the woven pattern of the wick to the bonding layer. The transferred pattern creates a discontinuity in the appearance of the bonding layer. Rubber wick liners are disadvantageous because they create a noticeable "step" on the bonding layer caused by the thickness of the rubber wick liner.

Following the assembly of the tire casing, bonding layer, tread layer, wick liner, and wick material, the overall retreaded tire assembly is placed within a flexible rubber envelope. An airtight seal is created between the envelope and the bead of the tire using a curing rim, or sealing rings. The envelope includes an exhaust fitting (e.g., "valve" as the term is used in the retreading industry). The exhaust fitting permits bidirectional airflow during the curing process. Typically, the exhaust fitting is disposed at a location remote from the tread splice, but directly over the wick. The wick is disposed between the exhaust fitting of the envelope and the tread surface. Placement of the exhaust fitting over the wick prevents the tread from blocking the exhaust fitting during the curing process.

The enveloped tire assembly is then placed in a curing chamber (e.g., autoclave), and subjected to heat and pressure for a specified period. The chamber is heated to approximately two-hundred and ten degrees Fahrenheit (210° F.) and pressurized to approximately eighty-five (85) psig. The exhaust fitting is connected to a hose that allows the pressure at the interior of the envelope to be controlled such that a pressure differential is created across the envelope. The combination of pressure and temperature over time cures the bonding layer, permanently mounting the new tread to the casing.

After curing, the sealing rings and the envelope are removed from the retreaded tire. The wick and staples are also removed from the retreaded tire. Typically, the staples are removed individually and fall to the floor of a work space. Removing the staples individually is labor intensive. Removing staples in this manner has the disadvantage of creating a cluttered work space that can potentially damage envelopes in the work space. Accordingly, it would be advantageous to provide a method and system to assist in the removal of air from an assembled tire during retread curing and to extract and retain temporary fasteners used during the curing of retreaded tires.

SUMMARY OF THE INVENTION

The present invention relates to a system to remove air from a retreaded tire assembly during curing. The tire assembly includes a tire casing with a peripheral surface, a bonding layer and tread layer wrapped about the peripheral surface. The tread layer includes at least a first end and a second end disposed proximate one another at a splice region when the tread layer is wrapped about the bonding layer in the circumferential direction. The system is configured to secure the splice region. The system includes a strap having a bottom portion comprised of substantially non-air permeable plastic and an air permeable top portion. The strap is disposed over a portion of the first and second end of the tread layer. The bottom portion of the strap is in contact with the tread and bonding material. The air removal and fastener extraction system further includes a plurality of fasteners perforating the strap and extending into the tread layer.

The present invention further relates to a method for retreading tires, which includes removing an old tread from a tire casing. The method further includes applying a bonding layer along the perimeter of the tire casing. The method still further includes wrapping a tread layer along the bonding layer until a trailing end is generally proximate a leading end to form a splice region. Also, the method includes orienting the strap along the splice region. Further, the method includes inserting a plurality of fasteners through the strap and into the tread layer. Still further, the method includes wicking air from between the envelope and the tire casing along and through the strap. In addition, the method includes curing the bonding layer. Also, the method includes pulling the strap to remove the plurality of fasteners.

DESCRIPTION OF THE DRAWINGS

The invention will hereafter be described with reference to the accompanying drawings, wherein like reference numerals denote like elements, and:

FIG. 4 is a perspective view of the tire casing shown in FIG. 3 showing a splice region and an air removal and fastener extraction system according to an exemplary embodiment of the present invention;

FIG. 5 is a top view of the air removal and fastener extraction system shown in FIG. 4;

FIG. 6 is a cross-sectional view taken along line 6—6 of FIG. 5;

FIG. 7 is a perspective view showing the air removal and fastener extraction system partially removed according to an exemplary embodiment of the present invention;

FIG. 8 is a cross-sectional view of a retreaded tire assembly encased in a curing envelope according to an exemplary embodiment of the present invention;

FIG. 9 is a cross-sectional view taken along line 9—9 of FIG. 8;

DESCRIPTION OF THE PREFERRED EMBODIMENTS

The present method and system to assist in the removal of air from an assembled tire during retread curing and to extract and retain temporary fasteners used during the curing of retreaded tires facilitates many of the known retreading processes and should not be limited to a specific process. Therefore, the use of the air removal and fastener extraction system is not limited to the method and system to assist in the removal of air from an assembled tire during retread curing and to extract and retain temporary fasteners used during the curing of retreaded tires described in the following paragraphs.

Figure 1:
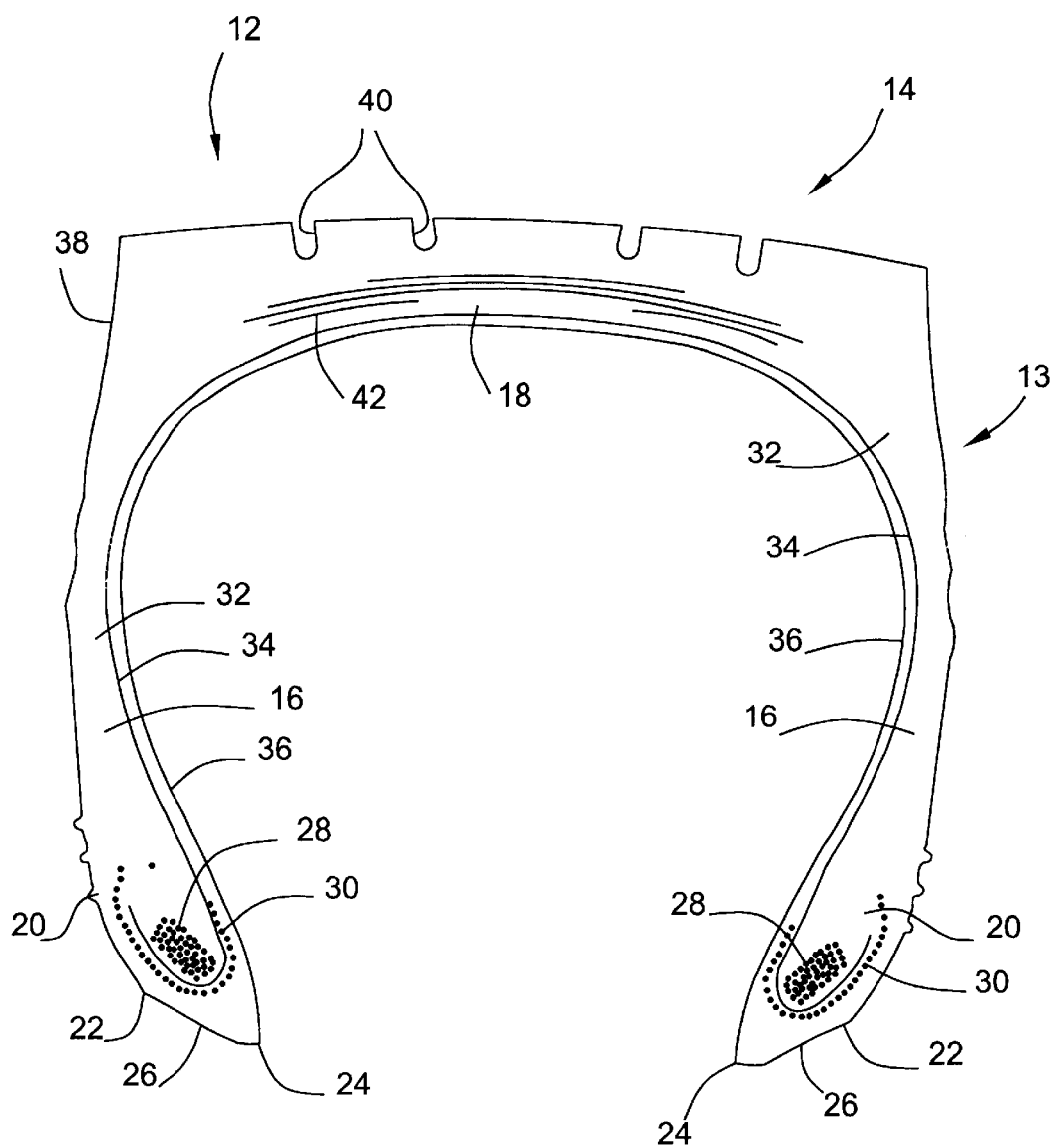
FIG. 1 is a cross-sectional view of an exemplary original tire.

Referring generally to FIG. 1, an original tire 12 is shown as having a tire casing 13 from which extends a tire tread 14. After a period of use, tire tread 14 becomes worn and tire 12 must either be replaced or retreaded. Although the illustrated tire 12 is a radial tire, the method and system to assist in the removal of air from an assembled tire during retread curing and to extract and retain temporary fasteners used during the curing of retreaded tires applies equally to other types of tires, such as bias ply tires or tires with various tread patterns.

Tire 12 generally includes a pair of sidewalls 16 bounded by a generally radially outward wall 18 that spans sidewalls 16. Each sidewall 16 extends radially inward from wall 18 and terminates in a bead area 20 designed for mounting on a tire rim (not shown). Bead area 20 may be designed in a variety of configurations depending on, for example, tire type, tire size, or rim configuration. According to an alternative embodiment, each bead area 20 includes a bead heel 22, a bead toe 24, and a bead sole 26. According to other alternative embodiments, each bead area 20 may include a bead bundle 28 and a chafer ply 30. According to a preferred embodiment as shown in FIG. 1, both bead bundle 28, and chafer ply 30 include metal strands or wires to improve the strength of bead area 20.

Figure 2:
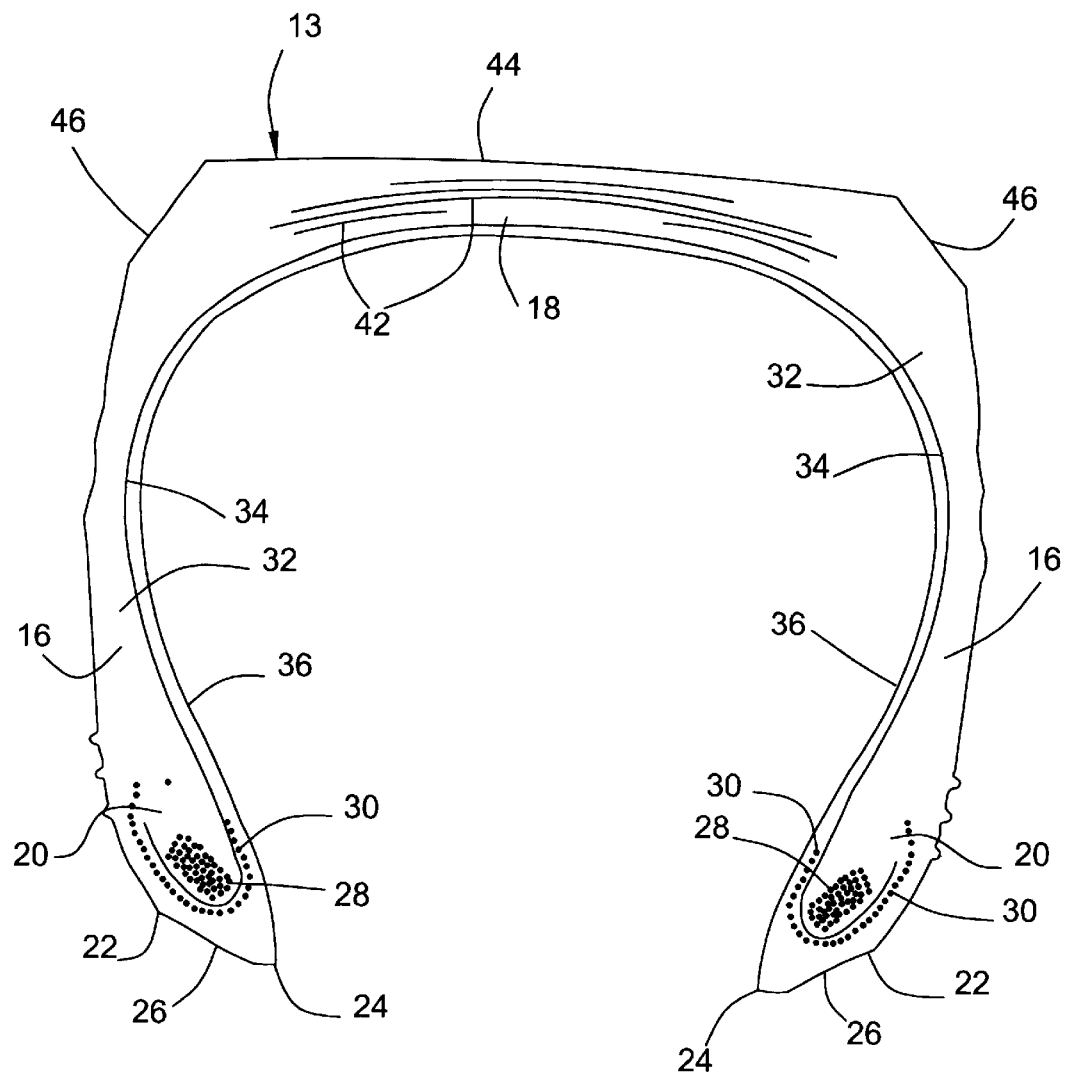
FIG. 2 is a cross-sectional view of the tire of FIG. 1 after the old tread layer has been removed from a tire casing.

Sidewalls 16 are joined to wall 18 and tread 14 through a pair of shoulder areas 38. Shoulder areas 38 extend toward tread 14, which in turn, are disposed radially outwardly from wall 18 of casing 13. According to an alternative embodiment as shown in FIG. 1, sidewalls 16 may also include multiple layers, such as a rubber layer 32, a radial ply 34, and an inner liner 36, which cooperate to provide a strong but flexible sidewall. According to other alternative embodiments as shown in FIG. 1, tread 14 may be provided with a plurality of grooves 40 designed to channel water and provide added traction during certain road conditions. The grooves may be of a variety of designs (e.g., radial, zigzag, crossed, etc.). According to other alternative embodiments as shown in FIGS. 1 and 2, wall 18 may be strengthened by a plurality of belts (shown as cords 42) extending circumferentially about tire 10 within wall 18.

After tread 14 wears beyond a certain limit, tire 12 should either be discarded or retreaded before it is used on the vehicle for which it was designed. In precure retreading, the remaining tread 14 is removed from casing 13 by a buffing machine, such as the Model 8200 buffing machine available from Bandag, Incorporated of Muscatine, Iowa. During the buffing operation, tread 14 is removed from casing 13, leaving a buffed surface 44 as illustrated in FIG. 2. Buffed surface 44 extends circumferentially about casing 13 and extends transversely across the outside of wall 18 until it terminates at buffed shoulder areas 46.

Following removal of tread 14, skiving and filling are performed on casing 13. Skiving is the removal of damaged material from a tire before making a repair. Often, casing 12 accumulates holes, nicks or tears due to stones or other sharp objects the tire contacts during use. The injured or damaged area is first treated with an appropriate grinding tool and then filled with repair gum, such as Bandag Extruder Repair Gum (available from Bandag, Incorporated of Muscatine, Iowa), or some other suitable material. The skived out injured areas are filled to the level of the buffed surface 44 to avoid air pockets from forming between buffed surface 44 and a later applied tread layer. Trapped air can have negative effects on the longevity of a typical retreaded tire.

Figure 3:
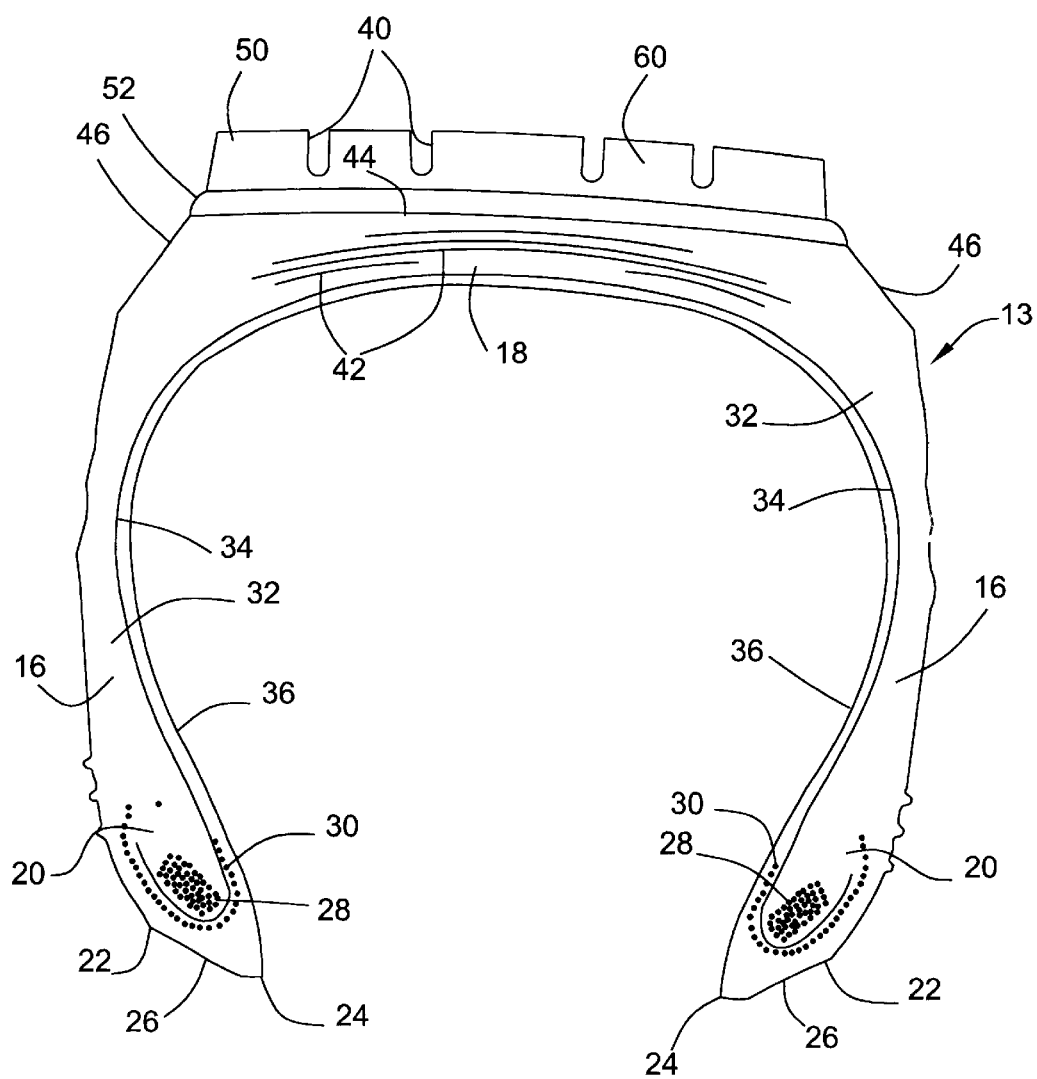
FIG. 3 is a cross-sectional view of the tire casing shown in FIG. 2 with the addition of a bonding layer and a new tread layer.

Following the skiving and filling operation, a new tread layer 50 is wrapped about the circumference of casing 12 with a bonding layer 52 (e.g., a natural rubber material or, for example, HD30 cushion gum available from Bandag, Incorporated of Muscatine, Iowa) disposed intermediate buffed surface 44 and tread layer 50 (see FIG. 3). Tread layer 50 includes a leading end 56 and a trailing end 58 disposed proximate one another in a tread splice region 60. In certain applications, a special tire cement is sprayed over buffed surface 44 and the combination of tread layer 50 and bonding layer 52 are wrapped about the circumference of casing 13. In other applications, the tire cement is eliminated and bonding layer 52 is initially wrapped about the circumference of casing 13 along buffed surface 44 in a slightly circumferentially stretched condition. The bonding layer 52 is then stitched (i.e., pressed) against buffed surface 44 to remove any air pockets that may have been trapped between bonding layer 52 and buffed surface 44. Following application of bonding layer 52, tread layer 50 is placed over bonding layer 52 and wrapped about the circumference of casing 13. According to an alternative embodiment, the tread layer includes a plurality of leading ends and trailing ends (not shown) to form a plurality of splice regions (not shown).

A retreaded tire assembly 54 is created when bonding layer 52 and tread layer 50 are wrapped about casing 13. An air removal and fastener extraction system 62 is disposed along splice region 60 of tread layer 50. System 62 includes a strap 64 disposed over at least a portion of leading end 56 and at least a portion of trailing end 58. (See FIGS. 4 through 6.) According to an alternative embodiment as shown in FIG. 4, strap 64 includes outer tabs 68 that wrap over a portion of sidewall 16 (so that strap 64 extends beyond any uncured rubber). A fastener (e.g., staple) can be inserted through this outer tab 68 transversely into the edge of tread layer 50. According to a preferred embodiment as shown in FIG. 5, strap 64 extends along splice region 60 across the entire width of retreaded tire assembly 54. A fastener 66 engages strap 64 to secure splice region 60 of tread layer 50. For typical securing of splice region 60, a plurality of fasteners 66 is inserted into the tread layer. As shown in FIG. 6, each fastener 66 includes a crossover portion 70 to which is connected a pair of prongs 72. Crossover portion 70 and prong 72 are oriented so one prong 72 extends into leading end 56 and the other prong 72 extends into trailing end 58 to press strap 64 to tread layer 50 along splice region 60. According to a preferred embodiment as shown in FIG. 6, splice region 60 is formed when a portion 74 of bonding layer 52 is disposed between leading end 56 and trailing end 58 generally perpendicular to the remainder of bonding layer 52. According to alternative embodiments, the portion can be a separate piece inserted into the splice region or be an upturned portion of the bonding layer positioned along the tire casing. According to a preferred embodiment, the fasteners are inserted at a spacing less than one inch from each next adjacent fastener. As will be understood by those who review this disclosure, a variety of fasteners, including custom built fasteners, tacks, adhesives, etc. could be used without departing from the scope of the invention.

Strap 64 and fasteners 66 can be applied by hand with a stapler such as an air stapler of the type available from BeA Corporation or Bostitch Company. A variety of other staplers known to those of ordinary skill in the art could also be used to apply system 62. In certain applications, it is beneficial to automate the application of system 62 as illustrated schematically in FIG. 11. A stapling assembly 104 includes a fastener applicator 106, such as a stapler. Stapling assembly 104 also includes a retainer strap dispenser 108, such as a canister, for holding a supply of strap material 110. A guide 112 directs a length of strap material 110 towards tire assembly 54. Strap material 110 flows across an opening 114 through which fasteners 66 are ejected from fastener applicator 106. Thus, strap 64 may automatically be applied to splice region 60 as fastener applicator 106 is moved along splice region 60.

Figure 11:
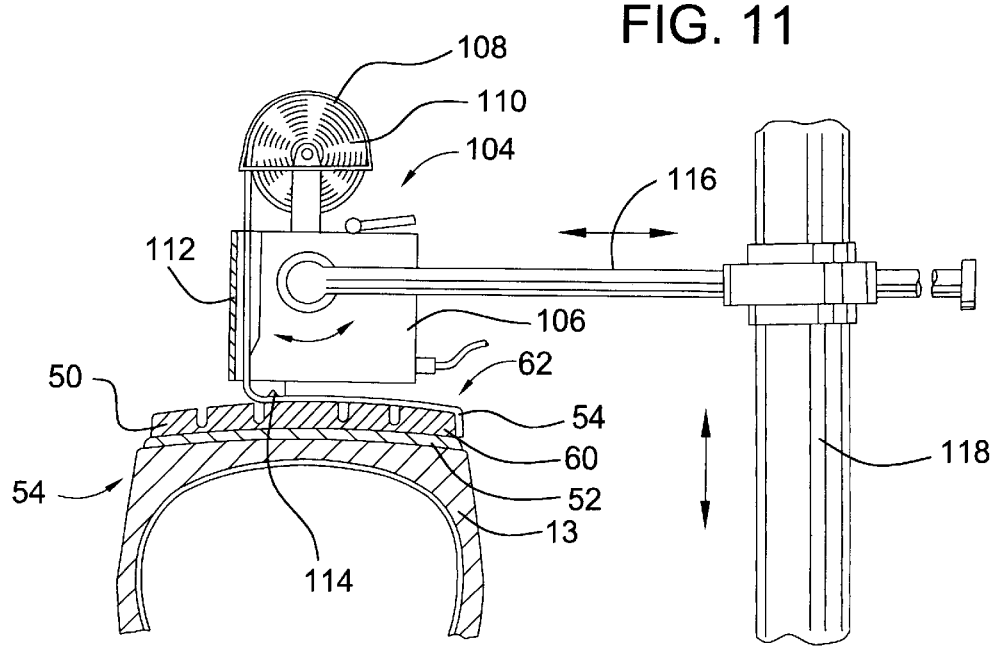
FIG. 11 is a fragmentary schematic illustration of an automatic fastener applicator for use with the air removal and fastener extraction system according to an exemplary embodiment of the present invention.

A variety of mechanisms may be used to move fastener applicator 106 in a direction along splice region 60 and/or in the direction towards and away from tread layer 50. According to an alternative embodiment as shown in FIG. 11, a horizontal slide bar 116 is used to provide the transverse movement along splice region 60 and a generally vertical slide bar 118 is used to provide generally vertical movement towards and away from tread layer 50. When a sufficient length of retainer strap 64 has been applied it is cut (e.g., with a knife (not shown)) and stapling assembly 104 becomes available for the next retreaded tire assembly. According to other alternative embodiments, the slide bars can be moved by hand, hydraulically, pneumatically or by motors as would be understood by someone of ordinary skill in the art.

After application of system 62, but before its removal, tire assembly 54 is cured. As illustrated in FIG. 8, retreaded tire assembly 54 is encapsulated in a curing envelope 76. Envelope 76 may be stretched over tire assembly 54 by hand or on a machine, such as the envelope application machine, Model 1240 available from Bandag, Incorporated of Muscatine, Iowa. Envelope 76 is constructed of a flexible, stretchable elastomeric material (e.g., natural rubbers, synthetic rubbers, or suitable plastics). According to an alternative embodiment as shown in FIG. 8, an inflation device 132 may be provided. According to a preferred embodiment, the envelope comprises halobutyl synthetic rubber formulated with fillers, extenders and curatives to provide high elongation, tear resistance, and sealability such as the material that comprises the Bandag Optimizer (TM) envelope available from Bandag, Incorporated of Muscatine, Iowa.

Figure 12:
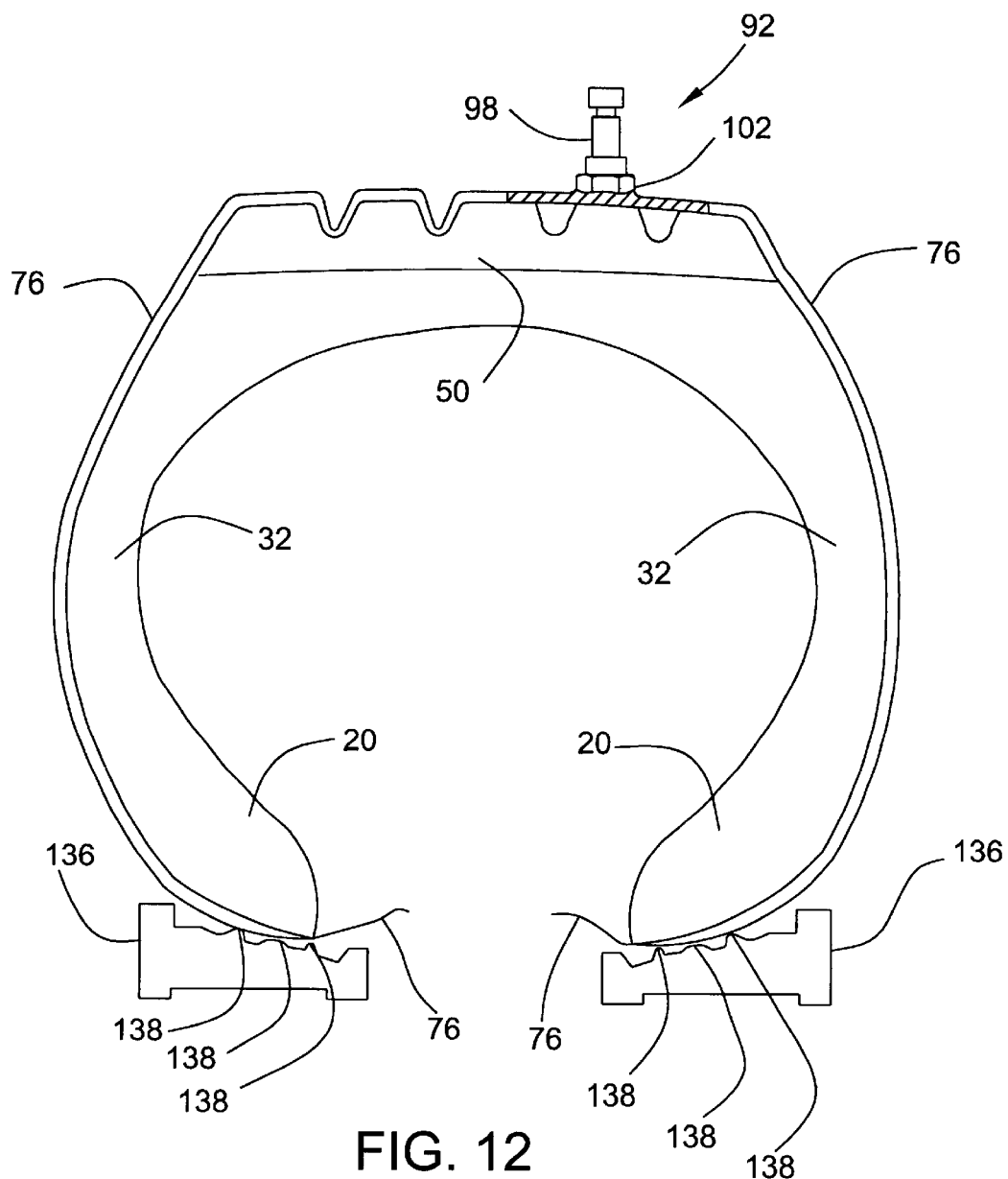
FIG. 12 is a cross-sectional view of a retreaded tire assembly encased in a curing envelope according to an alternative embodiment of the present invention.

As illustrated in FIG. 9, envelope 76 provides an interior surface 78 configured to be positioned adjacent the outer surface of tread layer 50. A pair of sidewall portions 80 is positioned along the outer surfaces of sidewalls 16 of casing 13. A pair of sealing portions 82 may be generally disposed to seal at bead areas 20 of casing 13. Envelope 76 is used in cooperation with a sealing rim assembly 84 designed to press sealing portions 82 of envelope 76 securely against the outer surface of bead area 20 to seal envelope 76 to retreaded tire assembly 54. Examples of suitable sealing rim assemblies 84 include rings, such as ARC Rings available from Bandag, Incorporated of Muscatine, Iowa, or an interlocking rim 86 having a pair of rim halves 88 that can be inserted from opposite sides of the tire, twisted and held together by releasable locks 90. These types of sealing rim assemblies are selectively used depending on the tire type and are known in the industry. According to an alternative embodiment of the present invention as shown in FIG. 12, ridges 138 of a sealing ring 136 may engage envelope 76 during curing of the tire assembly 54.

Envelope 76 also includes an exhaust fitting 92 mounted through an aperture 94 in the envelope 76. Exhaust fitting 92 includes a base plate 96 designed to be positioned along interior surface 78. A tubular portion 98 extends from base plate 96 outwardly through aperture 94. Tubular portion 98 includes a threaded region 100 over which a fastener (shown as a bolt 102) is threaded to secure the envelope 76 between base plate 96 and fastener 102 as illustrated in FIG. 9.

Air is evacuated from the interior of envelope 76 by wicking the air along and through strap 64 during curing of tire assembly 54. The use of strap 64 to facilitate the evacuation of air has multiple benefits including the elimination of a conventional porous wick, the elimination of a conventional wick liner, and increased wicking capabilities. To facilitate the wicking of air from envelope 76, strap 64 is positioned along splice region 60, and beyond shoulder areas 46 (see FIG. 4). Strap 64 is positioned directly along splice region 60 without the use of a wick liner. According to an alternative embodiment, a wick liner may be used in combination with the strap. According to a preferred embodiment as shown in FIG. 4, strap 64 spans at least a portion of leading end 56 and trailing end 58 of tread layer 50.

After placement of strap 64, envelope 76 envelops tire assembly 54 (see FIG. 9) so that strap 64 can wick and collect the air initially entrapped in enveloped tire assembly 54. A pressure differential is applied across envelope 76. Air migrates from tread layer 50 and sidewall 16, and is collected in the interstices of a top portion 119 of strap 64. The collected air then travels through the interstices of strap 64 and through grooves 40 until the air exits envelope 76 through exhaust fitting 92.

Strap 64 is constructed of a flexible material, and has a tear strength sufficient to pull fasteners 66 out of tread layer 50 without breaking, such that fasteners 66 are retained in strap 64 for disposal. Strap 64 wicks air at a rate equivalent to conventional wicks. Strap 64 includes top portion 119 and a bottom portion 120 (see FIG. 5). Strap 64 further includes straight non-frayed edges so that top portion 119 does not adhere to bonding layer 50 during curing of retreaded tire assembly 54.

The strap may be constructed from a variety of materials. Strap 64 includes a strong, thin, smooth, non-porous bottom portion 120 providing an air permeable top portion 119. The surface of bottom portion 120 of strap 64 comprises smooth plastic. The smooth surface of bottom portion 120 inhibits the creation of a non-random pattern on portion 74 of bonding gum layer 52. Bottom portion 120 is generally non-permeable to air. Because bottom portion 120 of strap 64 is essentially non-porous, uncured bonding layer 52 minimally penetrates and only minimally mechanically bonds to strap 64. Bottom portion 120 does not substantially chemically react with uncured bonding layer 52, so it does not significantly bond to the uncured rubber of tire casing 12 and tread layer 50. The thickness and surface texture of bottom portion 120 minimizes discontinuities that form as bonding layer 52 flows during the curing process.

Bottom portion 120 of strap 64 is heat laminated to top portion 119 of strap 64. Top portion 119 is permeable to air, and is made of non-woven fabric. Non-woven fabric is preferred over woven fabric because non-woven fabric creates a random pattern on portion 74 of cushion gum layer 52 when bottom portion 120 meets portion 74. According to a preferred embodiment, the strap is used only once, so that it does not get dirty or contaminated as do conventional wicks.

Figure 10:
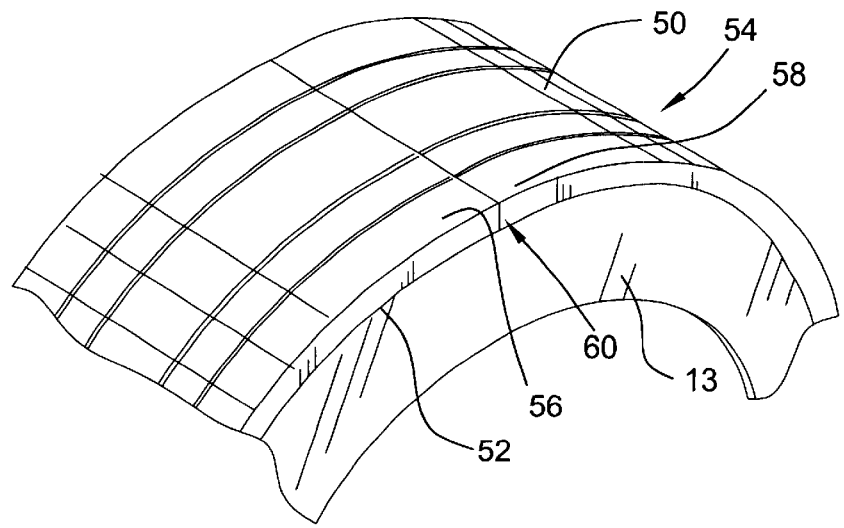
FIG. 10 is a perspective view of a retreaded tire assembly following curing and removal of a curing envelope and the air removal and fastener extraction system according to an exemplary embodiment of the present invention.

Following encapsulation of tire assembly 54, tire assembly 54 is placed in a curing chamber as is known in the art, and a pressure differential is created across envelope 76. Tire assembly 54 is subjected to heat and pressure to promote vulcanization of bonding layer 52. After curing, tire assembly 54 is removed from the curing chamber, envelope 76 is removed from the newly created retreaded tire, and strap 64 is pulled away from tread layer 50 to remove fasteners 66. This leaves a completed retreaded tire as illustrated in FIG. 10. According to an exemplary embodiment as shown in FIG. 7, removal of strap 64 is accomplished by grasping an end of strap 64 and pulling it away from tread layer 50 to remove strap 64 and fasteners 66 in a single motion. The retreaded tire assembly is thus completed without the labor-intensive removal of the individual fasteners and retains the fasteners for easy disposal. (See FIG. 7.)

According to an alternative embodiment as shown in FIG. 9, the use of base plate 96 permits the removal of air from the interior of envelope 76 without the necessity of interposing strap 64 between base plate 96 and tread layer 50. A porous wick (not shown) and a wick liner (not shown) would normally be placed between base plate 96 and tread layer 50 to facilitate the removal of air from between tire assembly 54 and curing envelope 76. The use of system 62 in combination with base plate 96 permits the evacuation of air without applying a porous wick and liner. According to a particularly preferred embodiment as shown in FIG. 9, base plate 96 of exhaust fitting 92 is approximately two and one-quarter inches (2¼") inches in diameter and the bottom of base plate 96 includes a plurality of radial vent grooves or slots, such as the Bigfoot valve provided in envelopes available from Bandag, Incorporated of Muscatine, Iowa. According to a particularly preferred embodiment, the strap is about 1 inch in width and about 12–18 inches in length, depending on the size of the tire used for the particular application. The strap may withstand temperatures of up to two-hundred and thirty degrees Fahrenheit (230° F.) for several hours without degradation, while retaining adequate strength to remove the fasteners after the curing process is complete. The strap is of black appearance, although a variety of colors may be used. A strap of black color tends to match the color of the tread layer. According to a particularly preferred embodiment, the bottom portion of the strap is geotextile laminate constructed of ultra-high molecular weight polyethylene. The bottom portion of the strap has a thickness of ten one-thousandths $(10/1000^{th})$ of an inch. The bottom portion includes a bottom non-adhesive layer, (not shown) a center layer for strength (not shown) and a top layer (not shown) to stick to fabric. According to a particularly preferred embodiment, the top portion of the strap has a thickness of about one-eighth inch (⅛"). The top portion of the strap is constructed of polypropylene.

Although only a few exemplary embodiments of the present invention have been described in detail in this disclosure, those skilled in the art who review this disclosure will readily appreciate that many modifications are possible in the exemplary embodiments (such as variations in sizes, structures, shapes, weights and proportions of the various elements, values of parameters, mounting arrangements, materials, type and structure of fasteners, tread designs, and use of a variety of tire retreading processes that may be used with the air removal and fastener extraction system) without materially departing from the novel teachings and advantages of the invention. Accordingly, all such modifications are intended to be included within the scope of the invention as defined in the appended claims. Other substitutions, modifications, changes and omissions may be made in the design, operating conditions and arrangement of the preferred embodiments without departing from the spirit of the invention as expressed in the appended claims.

What is claimed is:

1. A system to remove air during curing from a retreaded tire assembly having a tire casing providing a peripheral surface, a bonding layer and a tread layer wrapped about the peripheral surface, the tread layer having at least a first end and a second end disposed proximate one another at a splice region when the tread layer is wrapped about the bonding layer in the circumferential direction, the system configured to secure the splice region, the system comprising:

a strap having a first layer comprised of a substantially non-air permeable material and an air permeable second layer, the strap being disposed over a portion of the first and second end of the tread layer and oriented along the splice region, and the first layer in contact with the tread; and a plurality of fasteners configured for perforating the strap and extending into the tread layer.

2. The system as recited in claim 1, wherein the first layer comprises polyethylene.

3. The system as recited in claim 1, wherein the second layer comprises non-woven polypropylene fabric.

4. The system as recited in claim 1, wherein at least one of the plurality of fasteners include a pair of prongs, the pair of prongs being disposed so one prong enters the tread layer at the first end and the other prong enters the tread layer at the second end.

5. The system as recited in claim 1, wherein the strap extends transversely along and beyond the splice region.

6. The system as recited in claim 4, wherein the fasteners are metal.

7. The system as recited in claim 1, wherein the strap is about one inch in width.

8. The system as recited in claim 1, further comprising a liner positioned under the strap.

9. The system as recited in claim 5, wherein the strap is further disposed over a portion of a shoulder of the tire.

10. A method for retreading tires, comprising:

removing old tread from a tire casing;

applying a bonding layer along the perimeter of the tire casing;

wrapping a tread layer having a first end and a second end along the bonding layer about the perimeter of the tire casing until the first end is generally proximate the second end to form a splice region;

orienting a strap along the splice region, the strap having a first layer comprising a substantially non-air permeable material and an air permeable second layer, such that the first layer of the strap is in contact with the tread layer;

inserting a plurality of fasteners through the strap and into the tread layer;

placing the tire casing, bonding layer, tread layer, strap and fasteners in an envelope having an exhaust fitting;

wicking air from between the envelope and the tire casing along and through the strap;

curing the bonding layer;

removing the envelope; and pulling the strap to remove the plurality of fasteners.

11. The method as recited in claim 10, wherein orienting includes placing the strap over at least a portion of the first and second end of the tread layer.

12. The method as recited in claim 11, wherein inserting fasteners includes orienting each fastener so a first prong of each fastener enters the first end of the tread layer and a second prong of each fastener enters the second end of the tread layer.

13. The method as recited in claim 11, wherein orienting the strap and inserting fasteners are accomplished generally simultaneously.

14. The method as recited in claim 12, wherein applying a bonding layer includes disposing a portion of the bonding layer in the splice region between the first and second end of the tread layer.

15. The method as recited in claim 12, wherein the first and second prongs are both inserted through the strap.

16. The method as recited in claim 10, wherein the fasteners are retained in the strap.

17. The method as recited in claim 10, wherein orienting includes placing the strap over a portion of the shoulder of the tire.

18. The method as recited in claim 10, wherein wrapping the tread layer includes a tread layer having a plurality of ends to form a plurality of splices.

* * * * *

UNITED STATES PATENT AND TRADEMARK OFFICE
CERTIFICATE OF CORRECTION

PATENT NO.    : 6,270,602 B1
DATED         : August 7, 2001
INVENTOR(S)   : Johnston et al.

It is certified that error appears in the above-identified patent and that said Letters Patent is hereby corrected as shown below:

Column 6,
Line 66, "as a bolt 102)" should read -- as a nut 102) --

Column 7,
Line 30, "120 (see FIG. 5)." should read -- 120 (see FIG. 6). --
Line 32, "layer 50 during" should read -- layer 52 during --

Signed and Sealed this

Fifteenth Day of July, 2003

JAMES E. ROGAN
*Director of the United States Patent and Trademark Office*